H. A. HUMPHREY.
IGNITION ARRANGEMENT FOR INTERNAL COMBUSTION ENGINES AND OTHER PURPOSES.
APPLICATION FILED APR. 16, 1909.
1,053,395.
Patented Feb. 18, 1913.
5 SHEETS—SHEET 1.
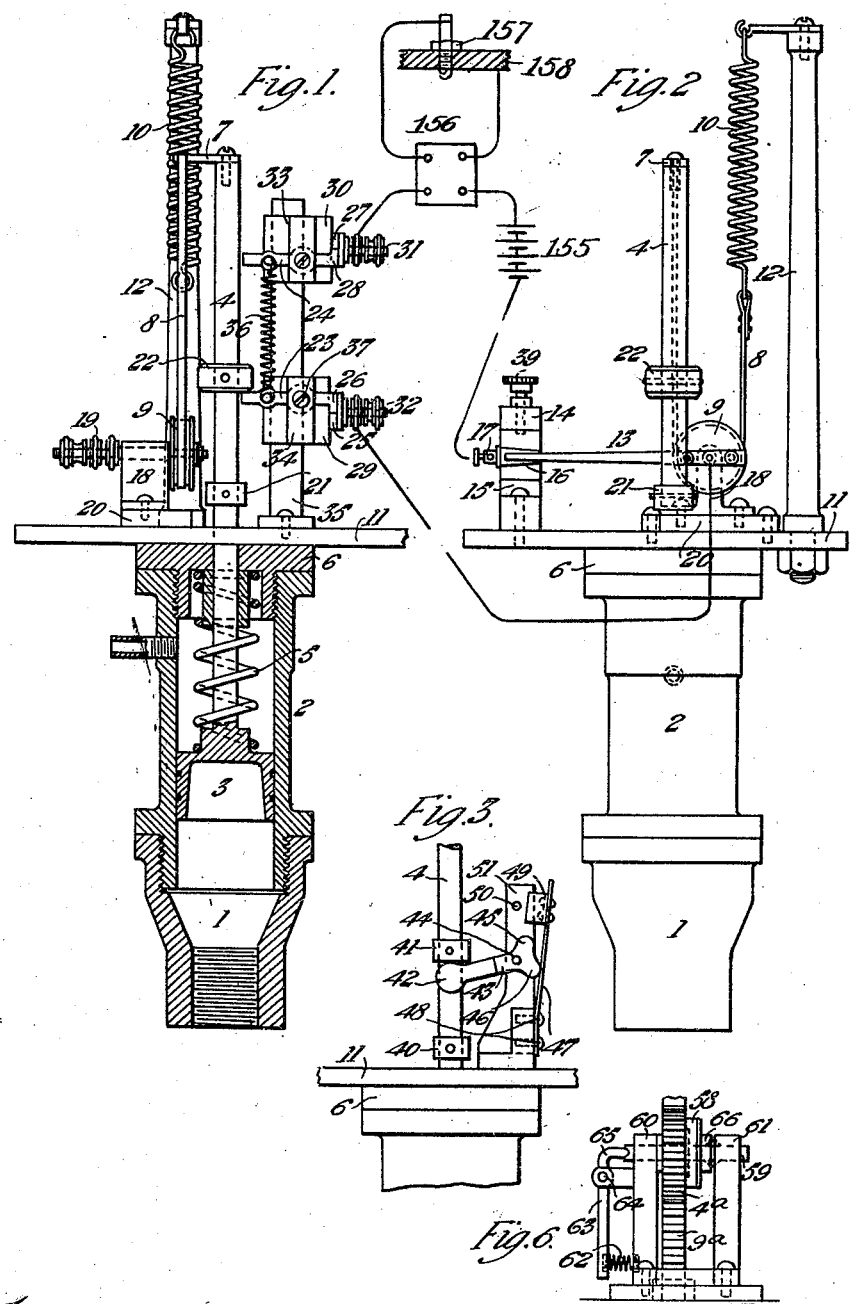

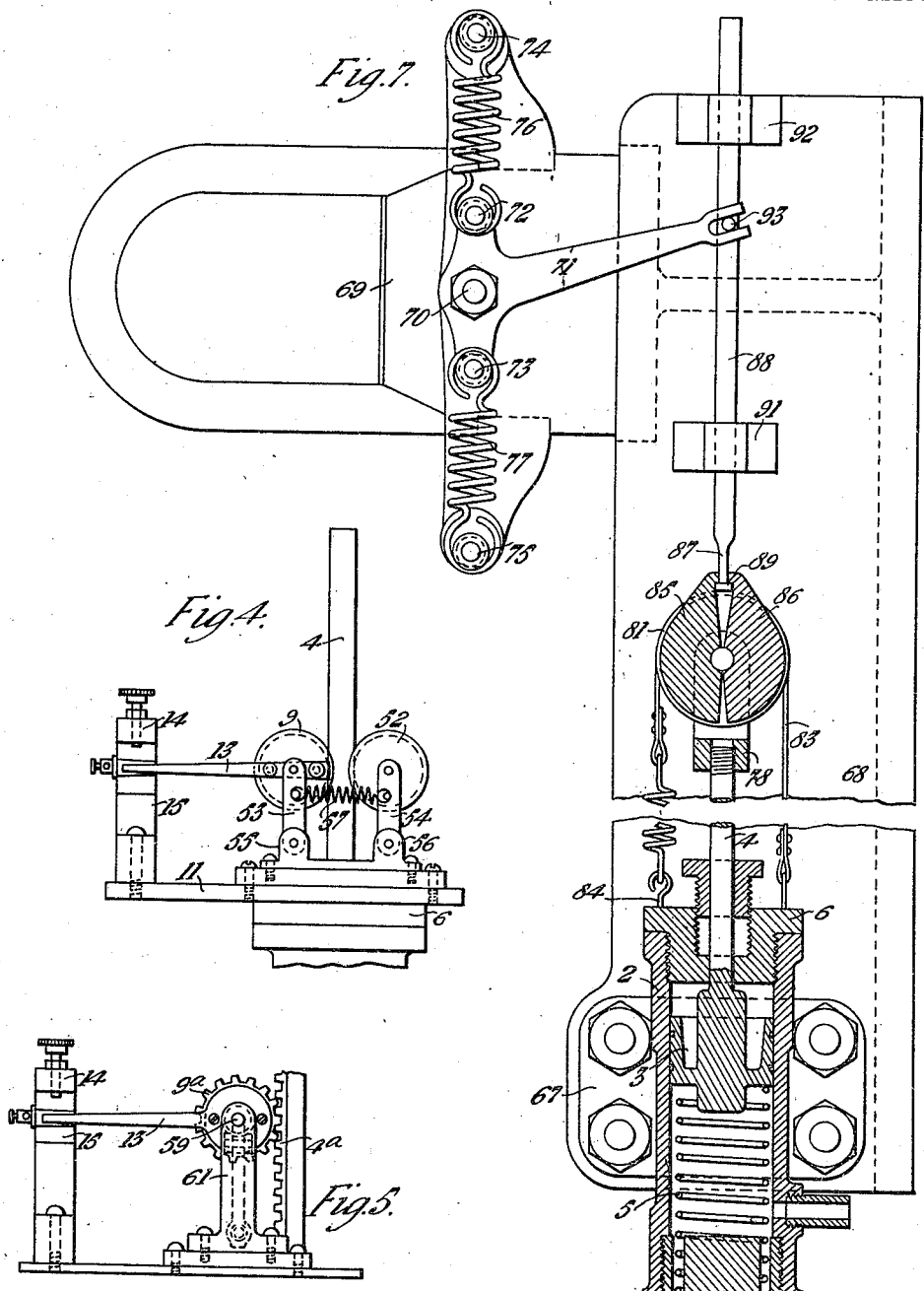

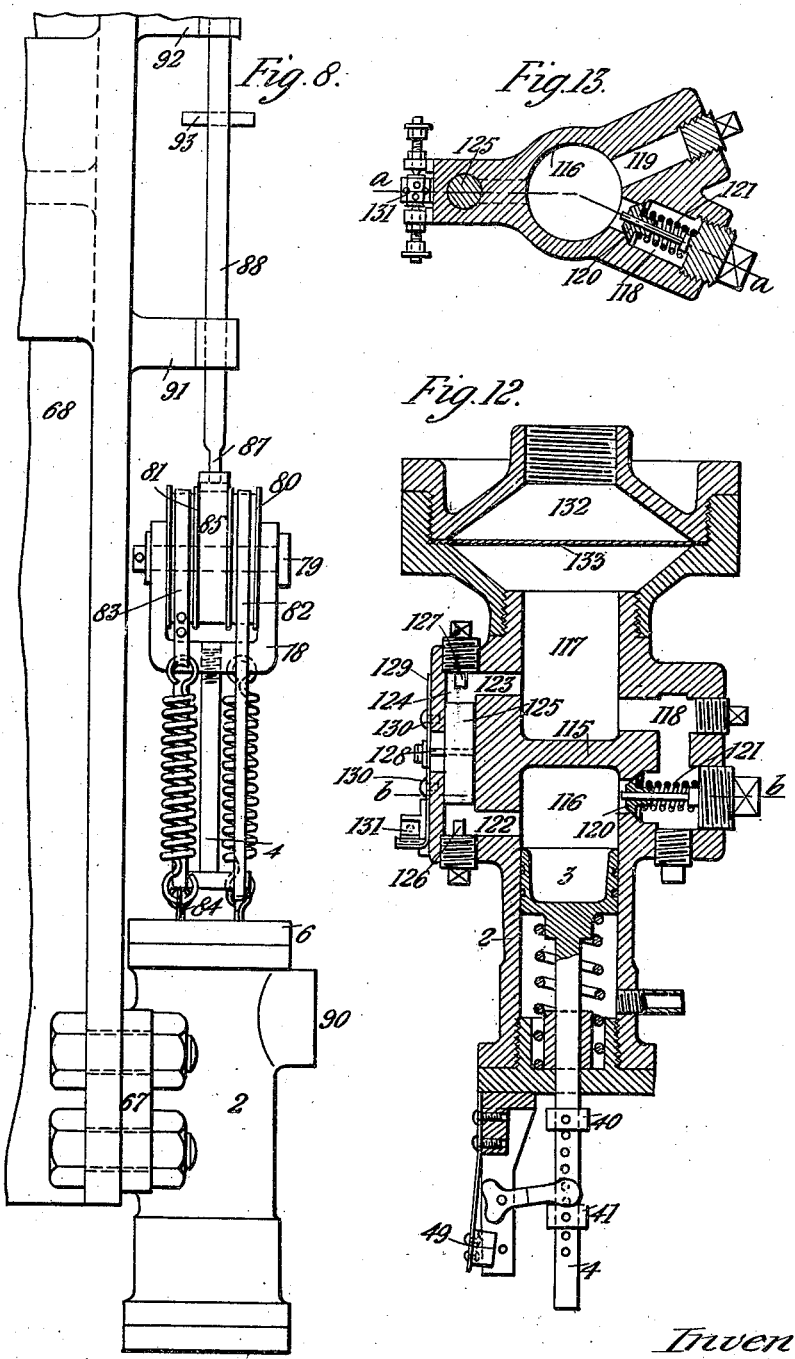

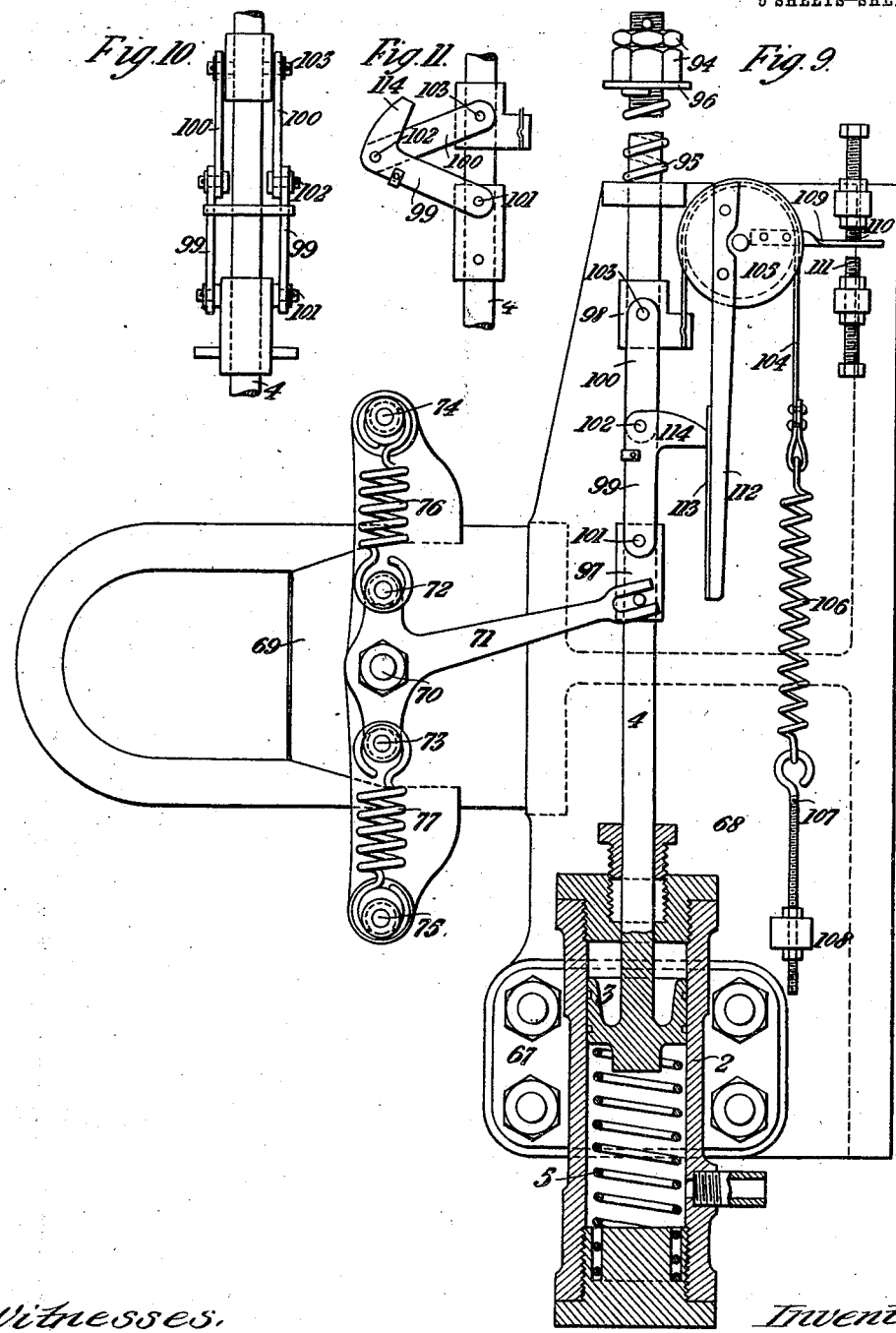

H. A. HUMPHREY.
IGNITION ARRANGEMENT FOR INTERNAL COMBUSTION ENGINES AND OTHER PURPOSES.
APPLICATION FILED APR. 16, 1909.
1,053,395.
Patented Feb. 18, 1913.
5 SHEETS—SHEET 5.
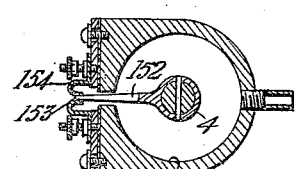
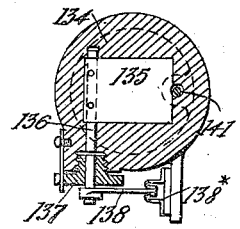
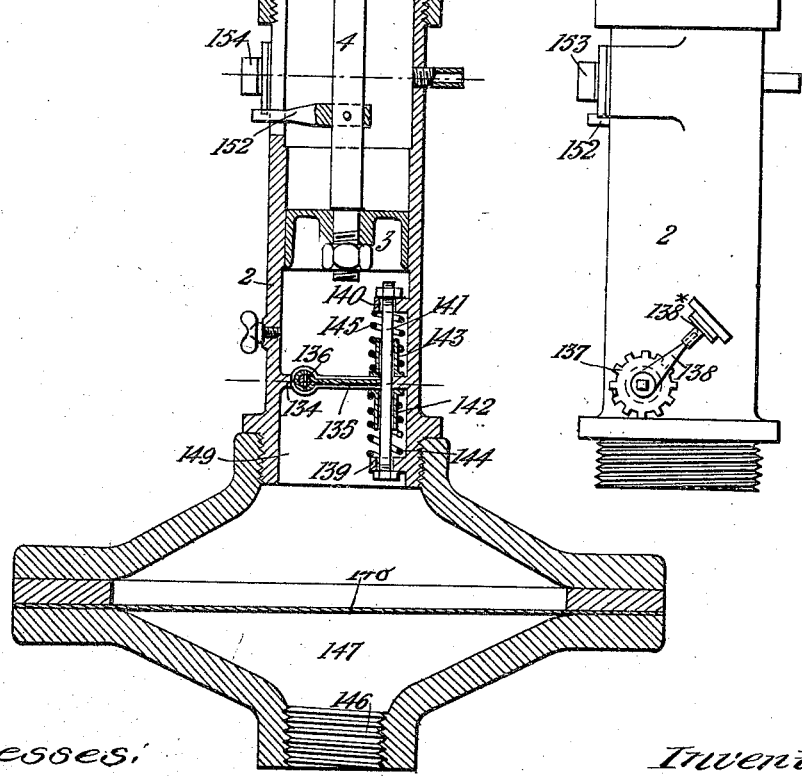
Witnesses:
Inventor
Herbert A. Humphrey
By James L. Norris
Atty.

UNITED STATES PATENT OFFICE.

HERBERT ALFRED HUMPHREY, OF WESTMINSTER, LONDON, ENGLAND, ASSIGNOR TO HUMPHREY GAS PUMP COMPANY, A CORPORATION OF NEW YORK.

IGNITION ARRANGEMENT FOR INTERNAL-COMBUSTION ENGINES AND OTHER PURPOSES.

1,053,395.

Specification of Letters Patent. Patented Feb. 18, 1913.

Application filed April 16, 1909. Serial No. 490,419.

*To all whom it may concern:*

Be it known that I, HERBERT ALFRED HUMPHREY, a subject of the King of Great Britain, residing at 38 Victoria street, Westminster, in the county of London, England, consulting engineer, have invented certain new and useful Improvements in and Relating to Ignition Arrangements for Internal-Combustion Engines and other Purposes, of which the following is a specification.

In my pending U. S. application, Serial No. 411,304, I have described a method of igniting a gaseous mixture in an internal combustion engine or the like, whereby the occurrence of the ignition is dependent upon the compression pressure having reached the maximum incidental to each particular charge.

My present invention relates to improvements in apparatus for applying this method and for rendering it more readily available in those cases where the ignition spark is produced by a magneto-machine.

According to the invention the movement of the small motor which in the form as herein shown comprises a piston and rod and is actuated by the pressure of the gaseous mixture as described in the aforesaid specification, is used to store energy, the whole or a part of which may be liberated steadily or suddenly, steady liberation being preferable when a battery and coil are used and sudden liberation when a magneto is used. Thus the small motor may store energy by loading one or more springs, lifting a weight, compressing an elastic cushion, or creating a vacuum, or any other suitable method. This energy, or a part thereof, is liberated or transformed to produce relative motion between parts of the apparatus in order to determine a spark or a succession of sparks at the ignition plug consequent upon the compression pressure having reached the maximum incidental to each particular charge.

The accompanying drawings illustrate several forms of apparatus constructed according to the invention.

Figures 1 and 2 are respectively a sectional elevation and a side elevation of one form of apparatus, certain parts having been removed in Fig. 2; Figs. 3–6 are detail views of modifications which may be introduced into this form. Figs. 7 and 8 are respectively a sectional elevation and a part side elevation of another form. Fig. 9 is a sectional elevation of a third form, Figs. 10 and 11 being detail views thereof. Fig. 12 is a vertical section through a fourth form, the section being on line $a$—$a$ of Fig. 13 which is itself a transverse section on line $b$—$b$ of Fig. 12. Fig. 14 is a vertical section and Fig. 17 an elevation of a fifth form, Figs. 15 and 16 being sectional detail views of this form.

In Figs. 1 and 2 are shown diagrammatically an electrical circuit and connections.

Referring first to Figs. 1 and 2, the pressure of the gaseous mixture is communicated from the cylinder of the internal combustion engine or the like through a pipe to which the connecting piece 1 of the small cylinder 2 is screwed. When the apparatus is used to ignite the combustible mixture in pumps of the type described in my pending U. S. application Serial No. 438,425 the pressure of the gaseous mixture is preferably communicated to the ignition apparatus through the medium of a liquid which fills the connecting pipe and the small cylinder 2 so far as the piston 3. As the pressure in the engine cylinder rises liquid is forced into the cylinder 2 and piston 3 is caused to compress the spring 5. Attached to the piston 3 is a rod 4 which passes through a hole or gland in the cover 6 screwed into the top of the small cylinder. This rod carries a projecting piece 7 to which is attached one end of a band 8 passing around a flanged metal wheel 9 and having its other end attached to a spring 10 which is supported by a plate 11 and a pillar 12. Rigidly fastened to the wheel is a metal switch arm 13 the motion of which is limited by two projecting stops 14 and 15 which form part of the switch block of insulating material. Let into the switch block so as to form a level surface for the switch arm to ride over in passing between the stops, is a metal contact piece 16 electrically connected with the terminal 17. The bearing 18 which carries the wheel 9 and the terminal 19 is insulated by the piece 20 placed between the bearing and metal plate 11. Rod 4 carries one or more projections or collars such as 21 and 22. The lower collar 21 is fastened to the rod by a pin and is only intended to limit the downward motion of piston 3. The upper collar is adapted to engage switch arms 23 and 24 and so to open the electrical circuit by separating movable contact 26 or 28 from stationary contact 25 or 27 respectively, 25 and 27 being insulated from the conducting switch bodies 33 and 34 by pieces 29 and 30 respectively.

The working of the apparatus is as follows:—An electric circuit, which includes a battery 155 and the low tension portion of a sparking coil 156, is connected with the apparatus at terminals 31 and 17. With the parts in the position shown the current passes from the battery through the sparking coil 156 to the terminal 31 through contact 28 and switch arm 24 to the body of switch 33 and so to the metal pillar 35, through switch body 34, contact 26, and switch arm 23 to terminal 32, thence by a wire not shown to terminal 19 through the spindle and metal wheel 9 along switch arm 13 and through contact piece 16 to terminal 17 and back to the battery, and so long as the parts remain in the position shown the trembler coil will cause a succession of sparks to pass at a high tension plug 157 fastened in the engine cylinder 158. This position, however, only occurs once in each cycle as will now be explained. At the beginning of the compression stroke spring 5 has urged piston 3 to a position in which collar 21 touches plate 11 and collar 22 has depressed switch arm 23 to open contact between 26 and 25. As compression proceeds piston 3 is forced upward and band 8 turns wheel 9 so that switch arm 13 passes from the lower stop 15 to the upper stop 14 which now limits the motion of the wheel and for the rest of the compression stroke band 8 has to slide around wheel 9 and stretch the spring 10. In moving as described switch arm 13 passes over contact 16 before collar 22 rises far enough to allow switch 34 to close so that the circuit is not completed during the passage of the switch arm over the contact; shortly afterward, however, collar 22 rising, allows spring 36 to turn switch arm 23 around pivot 37 and make contact between 26 and 25. When compression pressure has reached the maximum incidental to the particular charge and declines slightly therefrom piston 3 moves a short distance downward and spring 10 pulling on band 8 turns wheels 9 and switch arm 13 so that the latter passes from stop 14 to contact 16. The circuit is now completed and sparking occurs at the ignition plug so that the combustible charge is ignited. The consequent sudden rise of pressure causes the piston 3 to be pushed up until collar 22 strikes switch arm 24 and breaks the circuit at 28 and 27, the circuit having been also broken immediately after explosion by switch arm 13 moving again up to stop 14. When expansion occurs switch arm 13 passes from stop 14 to stop 15 before collar 22 is released from engagement against switch arm 24, and thus, when expansion has proceeded far enough to allow switch 33 to close, the circuit yet remains broken. As expansion proceeds collar 22 engages against switch arm 23 and opens the circuit at 26 and 25 until, when atmospheric pressure or thereabouts is reached, all the parts are once again in the position from which they started and the circuit remains broken during the exhaust and suction strokes in the engine cylinder and until the next compression stroke occurs, when the cycle of operations is repeated. The position of collar 22 on rod 4 can be adjusted and switches 33 and 34 can be made to slide on pillar 35 so that they may be secured in suitable relative positions, the object being that at pressures below the range of compression pressures switch 34 shall be opened by collar 22 and at pressures above the range of compression pressures collar 22 shall open switch 33. It will thus be seen that although switch arm 13 passes over contact 16 at the beginning of the compression stroke and also at the beginning of the expansion stroke yet no current passes in either case and the circuit is only completed when switch arm 13 passes to contact 16 at the end of the compression stroke as described. In order that a very small decrease of pressure at the end of the compression stroke may cause ignition, an adjustable screw 39 is fitted which forms the upper stop for switch arm 13 and by screwing down 39 the switch arm may be arrested so as to leave as small a gap between it and contact 16 as may be found convenient.

Instead of the two switches 33 and 34 shown in Fig. 1 a single switch may be made to answer the same purpose as will be described in connection with Fig. 3. Here the rod 4 carries two collars 40 and 41 both arranged to engage against a switch arm 42 which has an insulated portion 43 and is pivoted at 44; the part 43 has two rounded portions 45 and 46 adapted to press against a spring plate 47 which is rigidly fastened by screws 48 at one end and at the other end carries a contact piece 49 adapted to make contact with the terminal 50 which is fixed in an insulated body 51. In the position shown, collar 41 has depressed 42 and so by pressure between the rounded portion 46 and the spring plate 47 the latter has been forced outward to break contact between 49 and 50. As rod 4 rises spring plate 47 causes switch arm 42 to assume a horizontal position and brings 49 into contact with 50 thus closing this part of the circuit. 49 and 50 remain in contact until the lower collar 40 reaches switch arm 42 and turning it about pivot 44 causes the other rounded portion 45 to press the spring plate to the right and again break contact between 49 and 50. Collars 40 and 41 are adjustable on the rod so that the upper and lower limits of pressure at which the switch opens may be made to correspond with the range of compression pressures desired as explained with reference to the two switches in Fig. 1.

Instead of wheel 9 being turned by a band passing around it and receiving motion from rod 4 the rod itself may give motion direct to the wheel by frictional contact therewith as shown in Fig. 4. For the sake of equalizing the pressure on the two sides of the rod two wheels 9 and 52 are shown carried on forked arms 53 and 54 and bearings 55 and 56 the wheels being urged into frictional contact with the rod by spring 57. The action of this part of the apparatus is similar to that already described with reference to Fig. 1 since so long as switch arm 13 is between the upper and lower stops 14 and 15 any movement of rod 4 causes the wheel 9 and switch arm 13 to rotate, but when the switch arm has been moved against one of the stops further movement of the rod 4 in the same direction only causes slipping between rod 4 and wheel 9, but immediately rod 4 commences to move in a reverse direction wheel 9 and switch arm 13 also begin to move until their motion is again arrested by contact with the other stop.

A rack 4ª and pinion 9ª (Figs. 5 and 6) may be substituted for rod 4 and wheel 9. In this case the switch arm is attached to a friction disk 58 which rubs against but is not secured to pinion 9ª. The latter is secured to shaft 59 mounted in bearings 60, 61, and by friction drives the disk 58 and switch arm 13 which are free to revolve on the same shaft. The amount of pressure between the pinion and the friction disk may be adjusted by a compression spring 62 acting upon one arm of a lever 63 pivoted at 64; the other arm 65 presses the shaft and pinion to the right as shown in Fig. 6, and the thrust upon friction disk 58 is taken by a small ball bearing formed between the projecting portion 66 of the friction disk and the end of the bearing 61. In this arrangement the pinion friction disk and switch arm are free to move together between the limits imposed by stops 14 and 15 but when the switch arm is arrested by one of the stops the pinion and the rack alone continue to move until a reverse movement begins, when the whole of the parts once again begin to move together.

If the spark which causes ignition is to be derived from a magneto-machine instead of from a battery and ignition coil, as in the last case, a suitable arrangement is that shown in Figs. 7 and 8. In these figures and those which follow, the apparatus has been drawn with the axis of cylinder 2 vertical. In practice it is preferable that the position of the apparatus should be such that the said axis is horizontal. The cylinder 2 carries a foot 67 (Figs. 7 and 8) by means of which it is bolted to a long angle bracket 68, to which is also secured an ordinary magneto-electric machine 69. The armature of the magneto is secured to shaft 70 to which is attached forked lever 71 and two projecting lugs 72 and 73. Springs fastened to anchors 74 and 75 on the frame of the magneto tend to keep the armature in its normal position and arm 71 in the position shown. The object of the apparatus now being described is to draw arm 71 downward as the compression pressure rises, thus putting considerable tension on springs 76 and 77 and when the compression pressure has reached a maximum and begins to decline therefrom to release suddenly arm 71 so that springs 76 and 77 cause a quick partial revolution of the armature and produce a spark in the well known manner. For the purpose of giving the required motion to arm 71 there is fitted to rod 4 a crosshead 78 carrying a pivot 79 upon which two flanged wheels 80 and 81 can rotate within the limits of fixed stops. Passing over the wheels are bands 82 and 83 each fastened at one end to the cylinder cover 6 and at the other end to a spring. Only one band and spring is shown in Fig. 7 but both are shown in Fig. 8 and it will be observed that while the band shown in Fig. 7 has its fixed end at the right and its movable end attached to the spring at the left, the band on the other wheel is reversed in this respect so that its fixed end is secured at 84; the result of this arrangement being that when rod 4 commences to move in either direction the two wheels 80 and 81 rotate in opposite directions. Attached to wheel 80 is a jaw 85 and attached to wheel 81 is a jaw 86, these two jaws forming the left and right jaws shown in section in Fig. 7 where they are also shown gripping the reduced part 87 of a link 88 carrying a head 89 behind which the jaws engage.

The action of the apparatus is as follows:—Pressure is communicated from the engine cylinder to the small cylinder 2 through a pipe attached to the part 90 so that the pressure is exerted upon the top side of the piston 3. At the commencement of the compression stroke the parts are in the position shown in Fig. 7, and as the pressure rises piston 3 is forced downward against the action of spring 5 and springs 76 and 77. Jaws 85 and 86 engaging behind the head 89 cause link 88 to slide in its guides 91 and 92 and pin 93 in this link pulls lever 71 downward, thus rotating the magneto armature. When the compression pressure reaches a maximum incidental to the particular charge and begins to decline therefrom a small upward movement of rod 4 causes the wheels 80 and 81 to revolve in opposite directions and to open the jaws 85 and 86 attached to them, thus releasing link 88 and permitting springs 76 and 77 to give a quick motion to the armature and cause a spark in the usual manner. Explosion then occurs and piston 3, rod 4 and wheels 80 and 81 are all moved downward under the increased pressure and such motion may be limited either by spring 5 alone or by suitable stops. During this downward motion the jaws 85 and 86 close but subsequently, while the products of combustion expand in the engine cylinder the parts move upward again, and the jaws open and remain open until they pass over and a little beyond head 89. The respective parts remain in about the same relative positions during the exhaust and suction strokes and on the beginning of the next compression stroke when rod 4 commences to move downward jaws 85 and 86 close on to the reduced portion 87 while they are drawn against head 89 so that the further movement of rod 4 carries link 88 with it and the cycle of operations is repeated.

A modification of the apparatus last described is shown in Figs. 9-11, the small cylinder and piston being the same as in the last case but the rod 4 is now shown continued right through guide 92 and having a screwed end upon which nuts 94 are screwed to adjust the pressure on a compression spring 95 placed between washer 96 and guide 92. Easily sliding on rod 4 is a sleeve 97, and another sleeve 98 is rigidly fixed to rod 4. These two sleeves are connected by toggle links 99 and 100 pivoted at 101, 102, and 103, and shown in side view in Fig. 10. To the fixed sleeve 98 is fastened a band 104 which passes over a wheel 105 and has its other end attached to spring 106. A hook 107 fastened to lug 108 by nuts serves to adjust the tension on this spring. Wheel 105 carries an arm 109 which moves between adjustable stops 110 and 111 and limits the motion of the wheel. The latter also carries a long arm 112 on which is a plate 113 adapted to press against projections 114 on one of the toggle links and so to force the center pivot 102 to the left of the line of the pivots 101 and 103.

The action of the apparatus is as follows:—At the beginning of the compression stroke the parts are in the relative positions shown and the three pivots 101, 102 and 103 being all in a straight line the movement of sleeve 98 can be transmitted to sleeve 97 through the toggle links 99 and 100 thus causing the lever 71 to rotate the magneto armature against the action of springs 76 and 77 while the rising pressure forces piston 3 downward. During this movement of the piston the friction of band 104 on wheel 105 causes arm 109 to be tightly pressed against stop 110 but as soon as the compression pressure has attained the maximum incidental to the particular charge and commences to recede therefrom, wheel 105 is turned so that arm 109 passes from stop 110 toward stop 111. This motion of the wheel moves plate 113 to the left which, pressing against projection 114 pushes pivot 102 to the left of the line joining pivots 101 and 103 so that the toggle link can no longer sustain the thrust exerted between the fixed sleeve 98 and the sliding sleeve 97. The toggle link consequently suddenly collapses to the position shown in Fig. 11, thus allowing the magneto armature to receive a sudden movement due to the tension on springs 76 and 77 and to cause the spark which fires the explosive mixture. The rise of pressure on explosion moves the piston downward against the action of springs 5 and 95, but as the pressure falls again during expansion the springs move the piston upward once more until the toggle links are straightened out and again assume the position shown in the drawing and all parts are ready for a repetition of the cycle on the next compression stroke.

Low tension magneto electric machines are constructed in which the current produced by the armature magnetizes a movable part attached to one of the contacts of the sparking plug and so, by magnetic attraction, breaks the low tension current automatically. Such an arrangement may be used in connection with the apparatus described as it obviates the necessity for any other mechanism for breaking the low tension circuit. When high tension magnetos are used the spark jumps across a spark gap in the usual manner.

When the pressure of the combustible mixture in the engine cylinder is communicated to the ignition apparatus through a duct containing liquid the said liquid may be made to produce such relative motion between working parts of the apparatus as is required to fulfil the conditions for igniting the charge when the compression pressure has reached a maximum. In Figs. 12 and 13 for instance, the cylinder 2 in which the piston 3 of the apparatus moves may form a chamber divided by a wall 115 into two compartments 116 and 117 communicating with each other by two passages 118 and 119 controlled by non-return valves held against their seats by adjustable springs. In the figures one valve 120 and one spring 121 are shown but the other valve opening from chamber 117 to passage 119 is omitted. Ports 122 and 123 in the respective chambers communicate with a cylindrical bore 124 in which slides a piston 125 limited in motion by two stops 126 and 127. Attached to the piston by pin 128 is a plate 129 slotted to engage screws 130 and having one end turned up to carry an insulated metal piece 131 forming part of a switch, so that the said switch is closed when plate 129 is moved upward and opened when 129 moves downward. The liquid which conveys the pressure from the engine cylinder to the apparatus enters through a pipe screwed into one part of the inlet box 132, between the two parts of which is held a wire gauze strainer 133. For the proper action of the apparatus the whole of the spaces above the piston are filled with liquid and as the pressure on the compression stroke rises liquid is forced through the inlet box, chamber 117 and passage 119, causing the valve situated in this passage to open thus admitting liquid to force piston 3 downward against the action of its spring. Passage 118 remains closed by valve 120 and a difference of pressure, equivalent to that required to lift the valve and drive the liquid through passages 119 exists between the two compartments 116 and 117. Consequently the pressure on the two ends of piston 125 is unequal and the piston is urged downward against stop 126 thus opening switch 131. When the compression pressure has reached the maximum incidental to the particular charge and begins to decline therefrom the valve in passage 119 closes and valve 120 opens, liquid being forced past the last mentioned valve through passage 118 into compartment 117. Thus the difference of pressure in the two compartments is reversed and piston 125 moves upward closing switch 131 and producing a spark or a succession of sparks by means of the usual battery and sparking coil. The increase of pressure on explosion again causes the pistons 3 and 125 to move downward and during expansion of the burnt gases they both move upward again and take up the positions required for the commencement of the next compression stroke when the cycle of operations is repeated. The rod 4 attached to piston 3 carries collars 40 and 41 which operate a switch placed in series with the switch 131 and of the same kind as that described in connection with Fig. 3, so that the circuit is broken by this switch at pressures both below and above the range of compression pressures, thus eliminating the possibility of switch 131 causing a spark except at the end of the compression stroke. When in operation the apparatus should be placed with its axis horizontal.

A modification of the apparatus last described is shown in Figs. 14 to 17. The cylinder 2 in which the piston 3 moves is divided by a diaphragm 134 having an aperture into which a door 135 accurately but easily fits. The door swings on a pivot 136 to which it is rigidly attached, and this pivot is prolonged to pass through a gland 137 (Fig. 16) and carries a switch arm 138. Lugs 139 and 140 on the inner surface of the cylinder carry a guide rod 141 on which slide two sleeves 142 and 143 urged by springs 144 and 145 against the two sides of the door and thus normally keeping the door in its middle position so that it closes the aperture. The pressure from the engine cylinder is communicated to the apparatus at the screwed part 146 and after passing through the inlet box 147 and wire gauze 148 enters cylinder 2 by forcing open door 135 so as to allow more liquid to pass from compartment 149 into compartment 150 and act upon the piston 3 which is forced upward against the action of spring 151 as the pressure rises. When the compression pressure reaches the maximum incidental to that particular charge, the flow past door 135 to compartment 150 ceases and spring 145 pressing on door 135 tends to return it to its middle position even before the pressure begins to fall. If this motion does not cause switch arm 138 to enter its contact 138*, which will depend on the strength of spring 145, yet the first downward movement of piston 3 will cause the door to move on its hinge and so bring switch arm 138 against contact 138*, thus completing the circuit and producing the sparks which ignite the charge. The rise of pressure on the explosion causes the door to swing upward again and also drives the piston farther upward and on the expansion stroke the door and the piston again move downward where they remain during the exhaust and suction strokes and are ready to start a fresh cycle of operations on the next compression stroke. Attached to rod 4 is an arm 152 adapted to close contact between the insulated metallic parts 153 and 154 (Fig. 15) attached to terminals and in series with switch contact 138*. At low pressures the arm is below the metallic parts and at high pressures above them so that the circuit is kept open except within the range of the compression pressures desired and these parts last described take the place of switches 33 and 34 in Fig. 1, or switch 49 in Fig. 12. In operation the apparatus should be placed with its axis horizontal.

The invention is not confined to the particular apparatus described, but the principle on which it operates having been made clear it will be understood that the actual apparatus may be widely modified. Thus, where the ignition of the charge is to be effected by a magneto the apparatus has been described as storing energy in a spring or springs and then liberating this energy or a portion of the energy at an appropriate moment in the cycle. It is evident that energy can be stored by compressing an elastic cushion such as a quantity of air inclosed between the end of a small cylinder and a piston or by causing the motion of a piston to produce a vacuum, and that in either case the stored energy may be liberated to act suddenly upon another piston which in turn actuates the magneto. Any suitable part of the small motor, such as the wheel operated by the piston rod and band already described, may serve to operate a valve or valves in a pipe connecting the place where energy is stored to the place where the energy is utilized, the operation of such releasing device being determined by the compression pressure having reached its maximum.

Having thus described the nature of my invention and the best means I know of carrying the same into practical effect, I claim:—

1. In apparatus for igniting a charge of gaseous mixture in internal combustion engines and the like, an electrical ignition device connected with the engine, a motor operated solely by the changes of pressure in the engine cylinder, means operated by the motor to store energy, and a device adapted to control the ignition device and to be moved inoperatively in one direction by the motor when operated by the pressure of the gaseous mixture and operatively in a reverse direction by the action of the said energy, when liberated consequent upon the compression pressure of the mixture having reached the maximum incidental to each particular charge, to cause a spark to be produced at the ignition device.

2. In apparatus for igniting a charge of gaseous mixture in internal combustion engines and the like, an electrical ignition device connected with the engine, a motor operated solely by the changes of pressure in the engine cylinder, means operated by the motor to store energy, and a device adapted to control the ignition device and to be moved inoperatively in one direction by the motor when operated by the pressure of the gaseous mixture, and operatively in a reverse direction by the action of the said energy, when liberated consequent upon the compression pressure of the mixture having reached the maximum incidental to each particular charge, to cause a spark to be produced at the ignition device, the said controlling device comprising a controlling member and a driving connection between the motor and the said member whereby the member only follows the movement of the motor for a short distance each time the movement of the motor changes its direction and is shifted to an inoperative position, substantially as described.

3. In apparatus for igniting a charge of gaseous mixture in internal combustion engines and the like, a motor operated by the pressure of the gaseous mixture and adapted to store energy, an electric circuit containing a battery, an ignition device in said circuit and connected with the engine, means actuated by the said energy when liberated consequent upon the compression pressure of the mixture having reached the maximum incidental to each particular charge, to cause a spark to be produced at the ignition device, said means comprising a switch in said circuit, a driving connection between the motor and the switch whereby the switch is moved first into a closed position each time the movement of the motor changes its direction, and a second switch in series with the first switch and adapted to be opened by the motor when its stroke in either direction exceeds certain predetermined and adjustable limits, substantially as described.

4. In apparatus for igniting a charge of gaseous mixture in internal combustion engines and the like, a motor operated by the pressure of the gaseous mixture and adapted to store energy, an electric circuit containing a battery, an ignition device connected with the engine, means actuated by the said energy when liberated consequent upon the compression pressure of the mixture having reached the maximum incidental to each particular charge, to cause a spark to be produced at the ignition device, said means comprising a switch in said circuit, a driving connection between the motor and the switch whereby the switch is moved first into a closed position and then again into an open position each time the movement of the motor changes its direction, and a second switch in series with the first switch and adapted to be opened by the motor when its stroke in either direction exceeds certain predetermined and adjustable limits, substantially as described.

5. Means for the electrical ignition of a compressed combustible charge, comprising an electric circuit and means for closing and breaking the same and means actuated by the compression pressure of the charge for maintaining the closing means ineffective until after the maximum of such compression is reached, and circuit breaking means actuated by the expansion pressure.

6. Means for the electrical ignition of a compressed combustible charge, comprising an electric circuit and means for closing and breaking the same, and means actuated by the compression pressure of the charge for maintaining the closing means ineffective until after the maximum of such compression is reached and then rendering said closing means suddenly effective, and circuit breaking means actuated by the expansion pressure.

7. Means for the electrical ignition of a compressed combustible charge, comprising an electric circuit and means for closing and breaking the same, and means actuated by the compression pressure of the charge for maintaining the closing means ineffective until after the maximum of such compression is reached and then rendering the closing means effective immediately upon abatement of maximum pressure, and circuit breaking means actuated by the expansion pressure.

8. Means for the electrical ignition of a compressed combustible charge, comprising an electric circuit and means for closing and breaking the same, and means actuated by the compression pressure of the charge for maintaining the closing means ineffective until after the maximum of such compression is reached, means for adjusting the range of effective pressures for causing said actuation, and circuit breaking means actuated by the expansion pressure.

9. Means for the electrical ignition of a compressed combustible charge, comprising a source of electrical energy, a circuit connected therewith, a sparking device in said circuit and means for closing and breaking the circuit, comprising movable elements and an actuating device controlled by the compression pressure of the combustible charge, the parts arranged and adapted to effect the sparking immediately upon the fall of said compression pressure from maximum, and circuit breaking means actuated by the expansion pressure.

10. Means for the electrical ignition of a compressed combustible charge, comprising a source of electrical energy, a circuit connected therewith, a sparking device in said circuit and means for closing and breaking the circuit at a plurality of separated points, comprising movable elements and an actuating device controlled by the compression pressure of the combustible charge, the parts arranged and adapted to complete the circuit and effect the sparking immediately upon the fall of said compression pressure from maximum, and independently actuated circuit breaking means affected by expansion pressure.

In testimony whereof I have signed my name to this specification in the presence of two subscribing witnesses.

HERBERT ALFRED HUMPHREY.

Witnesses:
JOSEPH MILLARD,
W. J. SKERTEN.

Copies of this patent may be obtained for five cents each, by addressing the "Commissioner of Patents, Washington, D. C."